Patented Jan. 2, 1940

2,185,237

UNITED STATES PATENT OFFICE 2,185,237

PROCESS OF PREPARING THE NITRILES OF ALPHA-NAPHTHYL SUBSTITUTED LOWER FATTY ACIDS

John Weijlard and William H. Engels, Rahway, N. J., assignors to Merck & Co. Inc., Rahway, N. J., a corporation of New Jersey No Drawing. Application August 11, 1937, Serial No. 158,539

7 Claims. (Cl. 260—465)

This invention relates to a process of preparing the nitriles of alpha-naphthyl substituted lower fatty acids substantially free from the beta isomer and has as its object the provision of an easy method of preparing such nitriles.

It is known that alpha-naphthyl acetonitrile may be prepared by brominating alpha methyl naphthalene, and reacting the bromomethyl naphthalene with potassium cyanide. This process is objectionable in that alpha methyl naphthalene is not readily obtainable. In addition, during bromination, a large amount of bromine goes into the ring, forming bromination products which are difficult to separate from the desired product.

We have discovered that the nitriles of alpha-naphthyl substituted lower fatty acids may be easily prepared with a good yield by condensing naphthalene and a halogenated nitrile of a lower fatty acid in the presence of anhydrous ferric chloride. Contrary to expectations the reaction goes quite smoothly. The reaction may be expressed by the following equation:

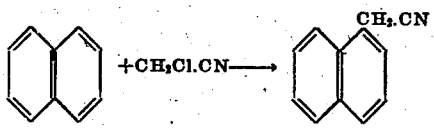

Naphthalene  chloracetonitrile  alpha-naphthyl acetonitrile

The following example illustrates one method of carrying out our invention, but it is to be understood that this example is by way of illustration and not of limitation.

Example 25 gm. of chloracetonitrile are mixed with 54 gms. of anhydrous ferric chloride, and 42 gms. of powdered naphthalene are added gradually with stirring. The reaction mixture is heated on an oil bath under reflux while stirring for two hours. Good results are obtained with an oil bath temperature of 165° to 185° C., but best results are obtained at 170° to 175° C. The thick reaction mixture is then poured onto 100 gms. of ice, 100 cc. of concentrated hydrochloric acid are added, and the mixture is stirred. The aqueous solution is decanted off and the moist semi-solid is agitated with 500 cc. of ether until disintegration takes place. The mass is filtered, the resinous residue on the filter washed with ether, and the ether filtrate washed several times with dilute hydrochloric acid to remove iron. The ether solution is finally washed with dilute alkali solution to precipitate any remaining traces of iron. Charcoal is added and the solution filtered. After evaporation of the ether, alpha-naphthyl acetonitrile is obtained by distilling at 191 to 194° C. at 18 mm. pressure. The chloracetonitrile may be replaced with good advantage by the corresponding bromine derivative in the above reaction.

To obtain nitriles other than alpha-naphthyl acetonitrile, the initial chloracetonitrile should be substituted by chlorpropiononitrile, chlorbutyronitrile, etc.

The alpha-naphthyl acetonitrile obtained as in the above example may be used as such, or in the preparation of other compounds. For example, it may be hydrolyzed in the known manner to alpha-naphthyl acetic acid, which has valuable plant growth properties.

Modifications may be made in carrying out our invention without departing from the spirit and scope thereof, and we are to be limited only by the appended claims.

We claim:

1. The process comprising condensing naphthalene and a halogenated nitrile of a lower fatty acid in the presence of anhydrous ferric chloride at a temperature of about 165 to 185° C.

2. The process comprising condensing naphthalene and a halogenated acetonitrile in the presence of anhydrous ferric chloride at a temperature of about 165 to 185° C.

3. The process comprising condensing naphthalene and chloracetonitrile in the presence of anhydrous ferric chloride at a temperature of about 170 to 175° C.

4. The process comprising condensing naphthalene and bromacetonitrile in the presence of anhydrous ferric chloride at a temperature of about 165–185° C.

5. The process comprising condensing naphthalene and bromacetonitrile in the presence of anhydrous ferric chloride at a temperature of about 170 to 175° C.

6. The process comprising condensing naphthalene and a halogenated butyronitrile in the presence of anhydrous ferric chloride at a temperature of about 165–185° C.

7. The process comprising condensing naphthalene and chlorbutyronitrile in the presence of anhydrous ferric chloride at a temperature of about 170 to 175° C.

JOHN WEIJLARD.
WILLIAM H. ENGELS.